Feb. 28, 1967  A. W. BLANSHINE  3,306,433
CONVEYOR
Filed Oct. 23, 1965
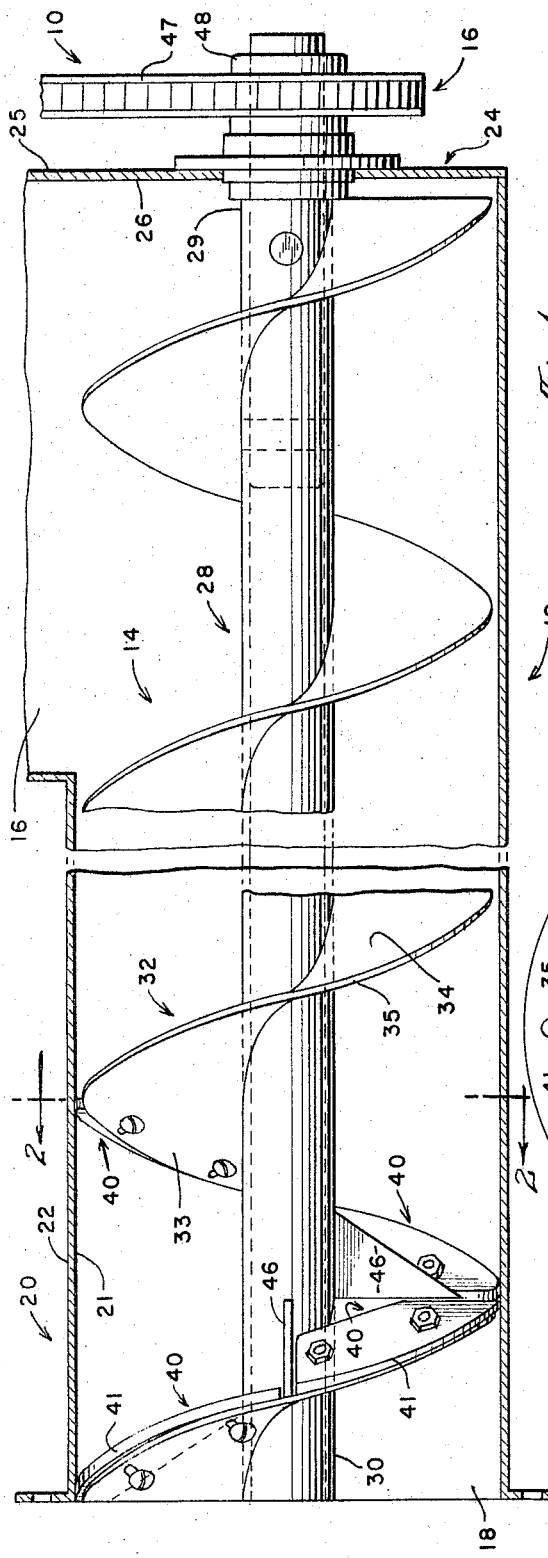
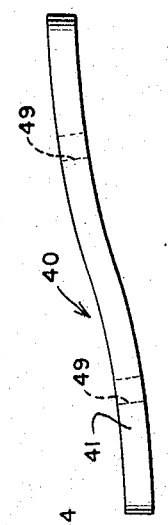
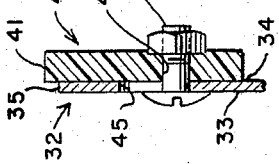
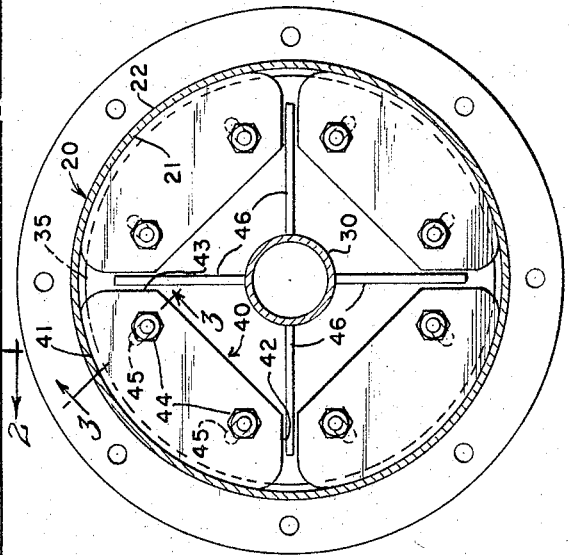
INVENTOR.
ALLISON W. BLANSHINE
BY
Donald D. Schaper
ATTORNEY

United States Patent Office 3,306,433
Patented Feb. 28, 1967

3,306,433
CONVEYOR
Allison W. Blanshine, Lititz, Pa., assignor to Sperry Rand Corporation, New Holland, Pa., a corporation of Delaware
Filed Oct. 23, 1965, Ser. No. 503,554
4 Claims. (Cl. 198—213)

This invention relates to conveyors, and more particularly, to an improvement in a bearing support for augers or helical feed screws.

It is common in relatively short screw conveyors to provide a conventional bearing for each end of the auger shaft. Bearings at the auger discharge end have been subject to various objections. The main objection is that the bearing acts as an obstruction to the passage of material from the conveyor, thereby interrupting the continuity of the screw and lessening the efficiency of the conveyor.

It is known in the art to provide support means on a conveyor auger flight in lieu of an auger shaft bearing at the conveyor discharge end. In one prior-art device, metal rollers are mounted on the auger flight and are located such that the rollers bear against the conveyor housing to support the auger as it is rotated. In another device, metal strips are riveted to the outer periphery of the auger flight, and the strips work in grooves or tracks in the conveyor housing. Both of these arrangements are relatively expensive and are permanently mounted so that there is no provision for replacing the parts or compensating for wear; further, neither of these devices is suitable for conveying certain types of materials e.g., fibrous material or extremely moist material.

Accordingly, one object of this invention is to provide a novel and improved auger bearing means in a conveyor of the type described.

Another object of this invention is to provide a bearing support in a conveyor of the character described which offers a minimum of resistance to movement of material by the auger.

Another object of this invention is to provide means for compensating for wear in an auger bearing support.

A further object of this invention is to provide an auger bearing support which is relatively inexpensive and can be installed and manufactured with a minimum of time and labor.

In the drawings:

FIG. 1 is a fragmentary side elevational view of the conveyor in longitudinal section and showing the auger bearing support of this invention;

FIG. 2 is a transverse vertical sectional view taken on the line 2—2 of FIG. 1 and showing the arrangement of the wear strips relative to the auger flight and gusset plates;

FIG. 3 is a sectional view taken on the line 3—3 of FIG. 2 and showing the wear strip adjusting means; and FIG. 4 is a view of the wear strip element and showing the contour of the strip body.

Referring now to the drawings by numerals of reference, and particularly to FIG. 1, a conveyor 10 is shown which comprises generally a housing 12, an auger 14 operable in the housing, and a drive means 16 for rotating the auger 14.

Conveyor housing 12 comprises an inlet 16, an outlet 18, a cylindrical tubular portion 20 having an interior wall 21 and an exterior wall 22, and a vertical end wall 24 having an exterior side 25 and an interior side 26.

Auger 14 comprises: a central shaft 28 having one end 29 journalled in end wall 24 and an opposite end 30 adjacent housing outlet 18 and at the discharge end of auger 14; and a helical auger flight 32 having a leading face 33, a trailing face 34, and an outer peripheral edge 35.

Bearing support means is provided at the discharge end of auger 14 by a plurality of wear strips 40 arranged on the outer periphery of auger flight 32, as best shown in FIGS. 1 and 2. Wear strips 40 are held in place on the auger flight trailing face 34 by fasteners 44 which pass through holes 49 in the wear strip and slots 45 in the flight 32. Slots 45 provide for radially outward movement of wear strip 40 relative to the auger axis to compensate for wear in the wear strip. A series of gusset plates 46 on auger shaft end 30 provide additional strength for the auger and are disposed between adjacent pairs of wear strips 40.

Each wear strip 40 has an outer arcuate contact surface 41 and a pair of ends 42, 43 which are generally radially extending when the wear strip is mounted on the flight. Fillets are formed at each junction of contact surface 41 with ends 42, 43 to eliminate sharp corners which would tend to trap material. The wear strips are preferably of a plastic material having a low coefficient of friction and being inert to water, oil, and most other liquids. A preferred material is nylon. As shown in FIG. 4, wear strip 40 is contoured and forms a segment of a helix so that it fits snugly against the auger flight when mounted thereon.

Drive means 16 for rotating auger 14 comprises a conventional roller chain 47 which extends around a sprocket wheel 48 detachably mounted to end 29 of auger shaft 28.

In operation, auger 14 is rotated in a clockwise direction when viewed from auger shaft end 29. Material entering inlet 16 is advanced toward discharge end 18 by the pushing action of auger leading face 33. Wear strips 40 provide bearing support means for the auger at the discharge end; the strips do not interfere with the material as it is advanced toward the discharge end, since they are mounted on the trailing face 34 of flight 32. It is, of course, understood that additional sets of wear strips can be provided at intermediate locations on the auger flight, if the length of the auger is such as to require additional bearing support.

In the preferred method of adjusting or replacing strips 40, sprocket 48 is first removed so that auger 14 can be moved axially out from housing outlet 18 a sufficient distance to provide access to all of the wear strips. The wear strips may be radially adjusted by means of slots 45 and threaded fasteners 44 to compensate for wear on the outer contact surface of the strip. After extended periods of use, it may be necessary to replace the wear strips. With the disclosed arrangement, the worn strips can be easily removed by removing fasteners 44. It will be seen from the foregoing description that a simple, inexpensive, and efficient bearing means is provided by the disclosed invention.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A screw conveyor comprising in combination, an auger housing having an inlet at one end and an outlet at an opposite end, said housing having an interior wall and an exterior wall, an auger operable in said housing, said auger having a central shaft and a helical auger flight thereon, drive means in operative engagement with said auger shaft at said one end for rotating said auger, said auger shaft being unsupported at said opposite end, said auger flight having an outer peripheral edge which moves in close proximity to said interior wall, said auger flight having a leading face which pushes material toward said outlet and a trailing face opposite from said leading face, said auger having a discharge end adjacent said outlet, a plurality of wear strips on said flight adjacent said discharge end, said wear strips being mounted on said flight trailing face, each of said wear strips having portions at least spaced axially from the other and having an outer surface radially outwardly spaced from said flight outer peripheral edge, said outer surface being in contact with said interior wall to provide a bearing support for said auger opposite end when said auger is rotated, each of said wear strips being formed from a relatively stiff non-flexible material, each of said wear strips being contoured and a segment of a helix to closely fit against the helical auger flight, and at least one threaded fastener extending through each of said wear strips and through slot means in said flight to hold said wear strip to said flight and to provide for radial adjustment of said wear strip relative to said flight.

2. A screw conveyor, as recited in claim 1, wherein each of said wear strips has a pair of generally radially extending ends, said outer surface is arcuate-shaped and extends between said sides, and a fillet is formed at each of the junctions of said outer surface with said radially extending ends.

3. A screw conveyor, as recited in claim 2, wherein each of said strips is formed from nylon.

4. A screw conveyor, as recited in claim 1, wherein a plurality of radially extending gusset plates are mounted on said auger shaft at said discharge end, and said gusset plates are connected to said flight and extend between adjacent pairs of wear strips.

References Cited by the Examiner
UNITED STATES PATENTS

| | | | |
|---|---|---|---|
| 292,550 | 1/1884 | Fairly | 198—213 |
| 2,311,865 | 2/1943 | Pilcher | 198—213 |
| 3,194,385 | 7/1965 | Barnese | 198—213 |

EVON C. BLUNK, *Primary Examiner.*

RICHARD E. AEGERTER, *Examiner.*